United States Patent
Domm

(10) Patent No.: US 8,472,116 B2
(45) Date of Patent: Jun. 25, 2013

(54) APPARATUS FOR COMBINING LIGHT FROM A PLURALITY OF COHERENT LIGHT SOURCES

(75) Inventor: John Domm, Kitchener (CA)

(73) Assignee: Christie Digital Systems USA, Inc., Kitchener, ON (CA)

(*) Notice: Subject to any disclaimer, the term of this patent is extended or adjusted under 35 U.S.C. 154(b) by 113 days.

(21) Appl. No.: 12/886,923

(22) Filed: Sep. 21, 2010

(65) Prior Publication Data

US 2012/0069447 A1    Mar. 22, 2012

(51) Int. Cl.
*G02B 27/10* (2006.01)
*G02B 27/14* (2006.01)
*G02B 27/00* (2006.01)
*G02B 5/00* (2006.01)
*G02B 7/00* (2006.01)

(52) U.S. Cl.
USPC .............. 359/618; 359/636; 359/894

(58) Field of Classification Search
USPC .. 359/618, 625, 627, 629, 636, 894; 362/551, 362/553
See application file for complete search history.

(56) References Cited

U.S. PATENT DOCUMENTS

| | | | |
|---|---|---|---|
| 7,184,213 B2* | 2/2007 | Dewald | 362/551 |
| 7,379,651 B2 | 5/2008 | Abu-Ageel | |
| 7,976,204 B2* | 7/2011 | Li et al. | 362/555 |
| 2005/0162853 A1 | 7/2005 | Jain | |
| 2009/0257106 A1 | 10/2009 | Tan et al. | |
| 2010/0172148 A1* | 7/2010 | Komazaki et al. | 362/551 |

FOREIGN PATENT DOCUMENTS

| | | |
|---|---|---|
| JP | 2004 146793 A | 5/2004 |
| WO | 2009/118880 A1 | 10/2009 |

OTHER PUBLICATIONS

J. W. Goodman: "Some fundamental properties of speckle", Nov. 1976.
European Patent Application No. 11181865.4 Search Report dated Jan. 4, 2012.

* cited by examiner

*Primary Examiner* — Alicia M Harrington
(74) *Attorney, Agent, or Firm* — Perry + Currier

(57) ABSTRACT

An apparatus for combining coherent light from a plurality of coherent light sources is provided. The apparatus includes a plurality of light guides, each including: a first mirror at an entrance face, including an aperture for admitting light therein from a respective one of the plurality of coherent light sources; and a second partially-reflective mirror at an exit face. The apparatus further includes a second stage light guide, for combining emitted light exiting the plurality of light guides, including: a second stage entrance face and a second stage exit face, the second stage entrance face for receiving the emitted light from each the exit face of the plurality of light guides; and a third mirror, at the second stage exit face, for reflecting the light back towards the second mirror, the third mirror including an exit aperture for the light to exit the second stage light guide.

11 Claims, 5 Drawing Sheets

APPARATUS FOR COMBINING LIGHT FROM A PLURALITY OF COHERENT LIGHT SOURCES

FIELD

The specification relates generally to illumination systems, and specifically to an apparatus for combining light from a plurality of coherent light sources.

BACKGROUND

Coherent light sources, such as lasers, are attractive light sources for projection displays, however suffer from a problem of speckle. Combining a plurality of coherent light sources can also be attractive as light for projection displays generally has a high intensity requirement.

BRIEF DESCRIPTIONS OF THE DRAWINGS

Embodiments are described with reference to the following figures, in which.

DETAILED DESCRIPTION OF THE EMBODIMENTS

The specification provides a apparatus for combining coherent light from a plurality of coherent light sources. The apparatus comprises a plurality of light guides. Each of the plurality of light guides comprises: an entrance face and an exit face; a first mirror at the entrance face, the first mirror comprising an aperture for admitting light therein from a respective one of the plurality of coherent light sources; and a second mirror at the exit face, the second mirror being partially-reflective and enabled to transmit a first portion of the light and reflect a second portion of the light back towards the first mirror. The apparatus further comprises a second stage light guide for combining emitted light exiting the plurality of light guides, the second stage light guide comprising: a second stage entrance face and a second stage exit face, the second stage entrance face for receiving the emitted light from each the exit face of the plurality of light guides; and a third mirror, at the second stage exit face, for reflecting the light back towards the second mirror, the third mirror comprising an exit aperture for the light to exit the second stage light guide.

A shape of the exit aperture can be matched to a shape of a light modulator of a projector.

An etendue of the exit aperture can be matched to an etendue of a light modulator of a projector.

Each of the plurality of light guides can be generally aligned with one another along a common longitudinal axis.

The plurality of light guides can be arranged in a regular array.

An area of the second stage entrance face can be generally matched to a collective area of the exit faces of the plurality of light guides.

The second stage entrance face can be optically coupled to each the exit face of the plurality of light guides.

A respective length of each of the plurality of light guides can be at least half as long as a coherence length of a respective one of the plurality of coherent light sources.

A length of the second stage light guide can be less than a length of the plurality of light guides.

Each of the plurality of light guides and the second stage light guide can comprise at least one of a solid light pipe and a hollow light tunnel.

At least a portion of the plurality of light guides and the second stage light guide can comprise reflective interior walls.

Figure 1:
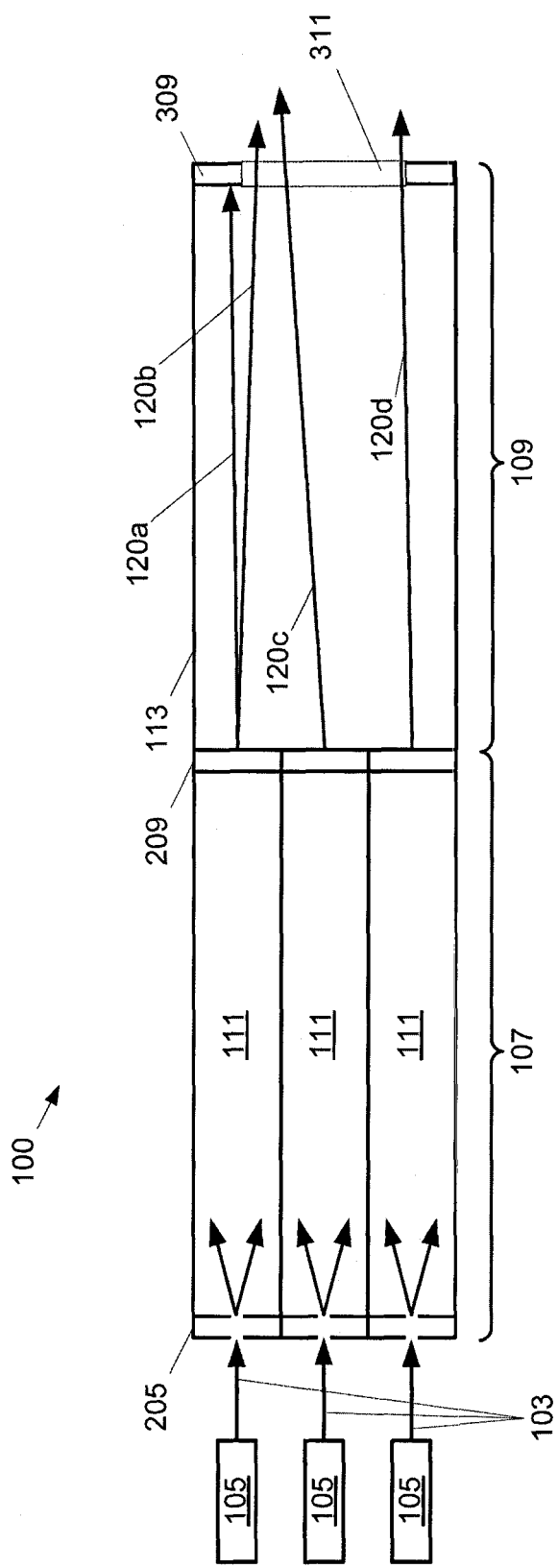
FIG. 1 depicts a side view of an apparatus for combining light from a plurality of coherent light sources, according to non-limiting implementations.

FIG. 1 depicts an apparatus 100 for combining light 103 from a plurality of coherent light sources 105 (referred to hereafter collectively as light sources 105 and generically as a light source 105). For example, each of light sources 105 can comprise a laser. Further, each light source 105 can emit light of any suitable colour; in some embodiments, light sources 105 comprise a plurality of colours such that, when combined, white light is produced. Apparatus 100 generally comprises a first stage 107 and a second stage 109. First stage 107 comprises a plurality of light guides 111 (referred to hereafter collectively as light guides 111 and generically as a light guide 111) which, in some implementations, can generally be in a one-to-one relationship with light sources 105. In other implementations, however, the number of light guides can be greater or less than a number of light sources 105.

Figure 2:
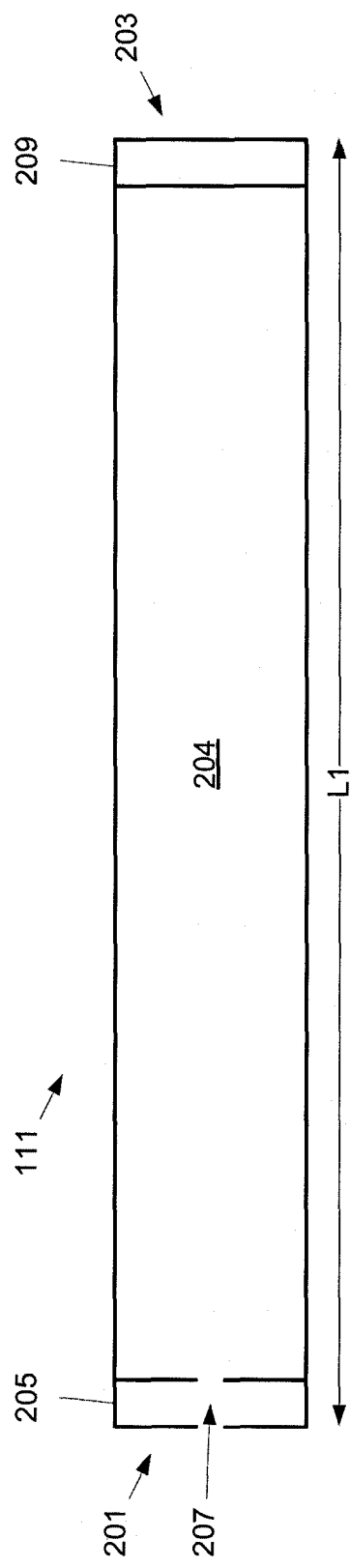
FIG. 2 depicts a light guide from a first stage of the apparatus of FIG. 1, according to non-limiting implementations.

Non-limiting implementations of light guide 111 are depicted in FIG. 2. Light guide 111 comprises an entrance face 201 and an exit face 203 separated by a body 204 having a length L1. Length L1 can be of any suitable length. In some non-limiting implementations, length L1 is approximately half a coherence length of light emitted from a respective light source 105. In further non-limiting embodiments, length L1 is at least half a coherence length of light emitted from a respective light source 105.

Light guide 111 guide further comprises a first mirror 205 at entrance face 203, first mirror 205 comprising an aperture 207 for admitting light therein from a respective light source 105 as depicted in FIG. 1. Light guide 111 further comprises a second mirror 209 at exit face 203, second mirror 209 being partially-reflective such that a first portion of light incident thereon is transmitted through second mirror 209 and a second portion of light incident thereon is reflected back towards first mirror 205. In general, aperture 207 is small compared to first mirror 205 such that light reflected back towards first mirror 205 does not exit aperture 207; it is appreciated that a respective light source 105 is focussed on aperture 207. Furthermore, it is appreciated that light entering body 204 via aperture 207 can be scattered.

It is further appreciated that while second mirror 209 is partially reflective, the reflectivity is generally high such that the first portion of light transmitted there through is small compare to the second portion reflected back towards first mirror 205. For example, in some implementations, up to 99% of light is reflected back towards first mirror 205 and up to 1% of light is transmitted by second mirror 209. Hence, as light reflects between first mirror 205 and second mirror 209, a small portion of the light exits through exit end 203 at each reflection from second mirror 209; the light exiting light guide 111 then has reduced coherence as each portion that exits is out of phase with the other portions exiting. Furthermore, in implementations where length L1 is at least half a coherence length, the reduction in coherence is enhanced due to the loss of coherence as the light reflects between first mirror 205 and second mirror 209. Scattering of the light at aperture 207 as the light enters light guide 111 further contributes to the reduction in coherence.

In some implementations, light guide 111 can comprise a solid light pipe and/or a hollow light tunnel. Furthermore, light guide 111 can further comprise any suitable additional elements. For example, light guide 111 can include a lens at aperture 207 to enhance scattering, reflective walls in body 204, coatings on first mirror 205 and/or second mirror 209, or the like.

Returning now to FIG. 1, any first stage 107 can comprise any suitable number of light guides arranged in any suitable manner. In particular non-limiting implementations, light guides are generally aligned with one another along a common longitudinal axis. In further non-limiting embodiments, light guides 111 are arranged in a regular array. In further non-limiting embodiments, light guides 111 are stacked adjacent to one another, along a common longitudinal axis in an array. In particular non-limiting implementations, first stage 107 comprises nine light guides arranged in a 3×3 array, for accepting light 103 from nine light sources 105 of any suitable combination of colours, each light guide 111 being of a similar length L1. In other implementations, however, the length of each light guide 111 can be the same or different.

Figure 3:
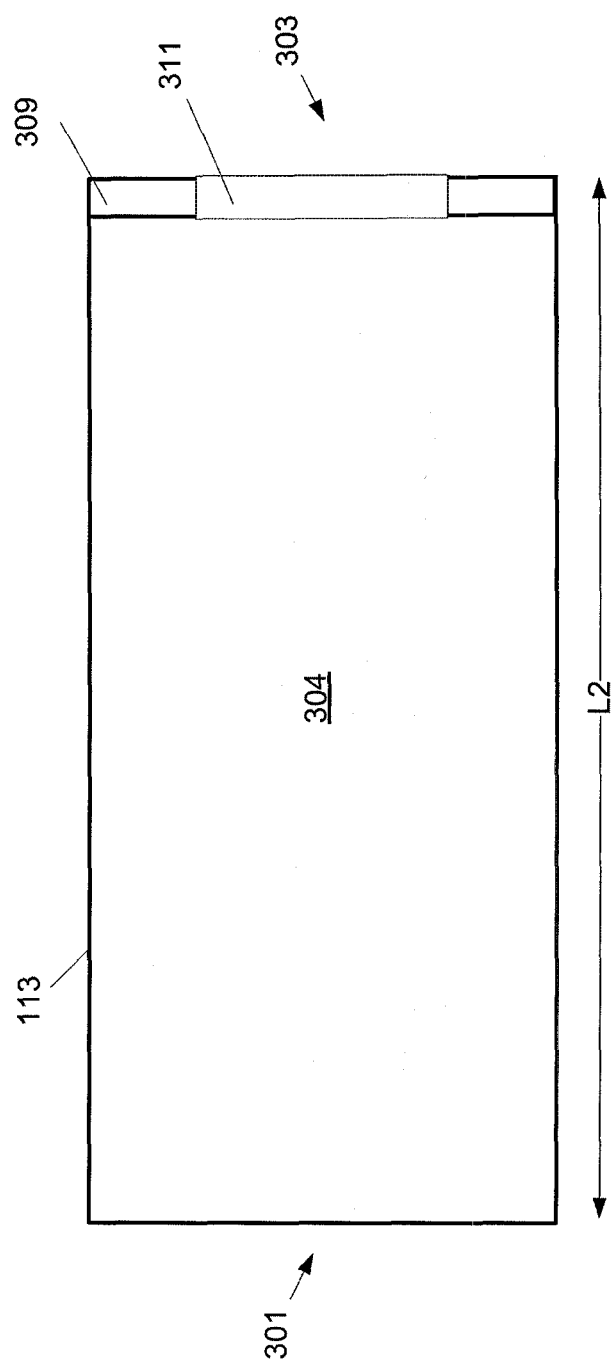
FIG. 3 depicts a light guide from a second stage of the apparatus of FIG. 1, according to non-limiting implementations.

Second stage 109 comprises a light guide 113 for combining light exiting the plurality of light guides 111. Non-limiting implementations of light guide 113 are depicted in FIG. 3. Light guide 113 comprises an entrance face 301 and an exit face 303 separated by a body 304 having a length L2. Length L2 can be of any suitable length. In some non-limiting implementations, length L2 is approximately half a coherence length of light emitted from a light source 105. In further non-limiting embodiments, length L2 is at least half a coherence length of light emitted from a light source 105. However, in yet further embodiments, length L2 can be less than half a coherence length of light emitted from a light source 105 and/or less than length L1.

Entrance face 301 is generally enabled to receive light emitted from each exit face 203 of each of the plurality of light guides 111. For example, an area and shape of entrance face 301 is generally matched to a collective area of exit faces 203 of the plurality of light guides 111. Hence, when light guides 111 are arranged in an array, then the area of entrance face 301 is generally similar to the area of the array that comprises exit faces 203. Furthermore, it is appreciated that entrance face 301 can be optically coupled to each exit face 203 of the plurality of light guides 111, for example using any suitable optical epoxy.

As the light which enters light guide 113 from light guides 111 travels through body 304, the light is combined; hence light from the plurality of light guides 111 is combined via light guide 113.

Figure 4:
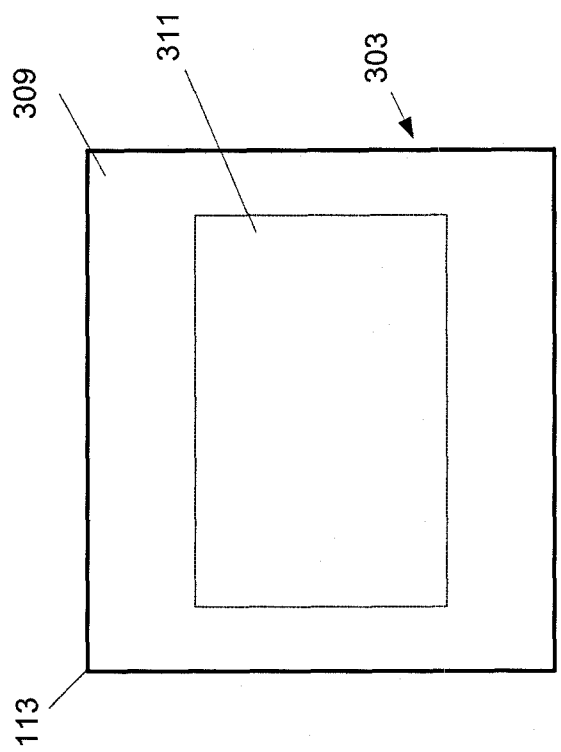
FIG. 4 depicts an end-view of the light guide of FIG. 3, according to non-limiting implementations.

Light guide 113 further comprises a third mirror 309 at exit face 303. Third mirror 309 is generally enabled to reflect light back towards second mirror 209 of light guides 204. It is further appreciated that third mirror 309 further comprises an exit aperture 311 so that light can exit light guide 113. It is appreciated that aperture 311 generally comprises an optical aperture for light to pass there through. It is yet further appreciated that wherein a shape of exit aperture 311 is matched to at least one of a shape of a light modulator of a projector and an etendue of the light modulator of a projector. For example, FIG. 4 depicts an end-view of light guide 113, depicting end face 303, third mirror 309 and exit aperture 311. It is appreciated from FIG. 4 that, in these non-limiting implementations, exit aperture 311 comprises a rectangular shape having an aspect ratio matched to an aspect ratio of a light modulator in a projector (e.g. 4:3, 16:9 or the like). Hence, third mirror 309 is enabled to mask light as it exits light guide 113.

With regard to etendue, attention is directed to FIG. 1 where four example light rays 120a, 120b, 120c and 120d (collectively light rays 120 and generically a light ray 120) are depicted travelling through light guide 113. It is appreciated that light ray 120a is travelling at a position that causes it to be reflected by third mirror 309, while light rays 120b, 120c and 120d are travelling at positions that enable them to pass through aperture 311. Hence, light rays at a position outside aperture 311 are reflected by third mirror 309 matching the etendue of light exiting light guide 113 to a light modulator of a projector; these light rays are reflected back into light guide 113 for further reflection from second mirror 205 until the exit position becomes suitable for exiting aperture 311 thereby increasing the light efficiency of apparatus 100.

In some implementations, light guide 113 can comprise a solid light pipe and/or a hollow light tunnel. Furthermore, light guide 113 can further comprise any suitable additional elements. For example, light guide 113 can include reflective walls in body 304, coatings on entrance face 301, exit face 303, third mirror 309, or the like for increasing reflectivity and/or transmissivity of light.

It is further appreciated that aperture 303 can include any coatings for increasing transmissivity of light there through. For example, when light guide 113 comprises a solid light pipe, end face 303 can be coated in the region of aperture 311 with a coating for increasing transmissivity. Indeed when light guide 113 comprises a hollow light tunnel, end face 303 can further comprise a solid optical portion for preventing dust or the like from entering the hollow light tunnel; in these implementations, the solid optical portion can be coated in the region of aperture 311.

Furthermore, it is appreciated that exit face 301 can include a mirror similar to second mirror 209, presuming that the reflectivity and transmissivity of each of second mirror 209 and the mirror at exit face 301 are taken into account when designing apparatus 100. In other words when a reflectivity of 99% and a transmissivity of 1% is desired at exit face 203, the reflectivity and transmissivity of both mirrors is considered.

Figure 5:
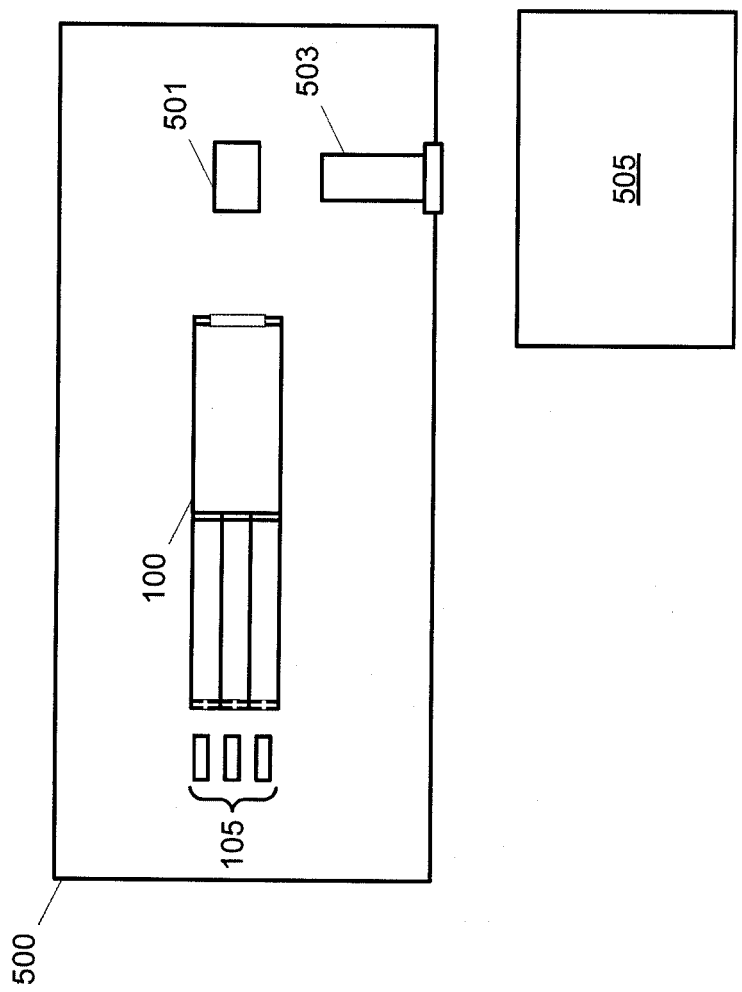
FIG. 5 depicts a schematic block diagram of a projector, according to non-limiting implementations.

Attention is now directed to FIG. 5 which depicts a schematic block diagram of a projector 500 comprising light sources 105, apparatus 100, a light modulator 501 and a lens 503 which projects images from projector 500 onto a screen 505. Coherent light is emitted from light sources 105 and travels through apparatus 100 where its coherency is reduced and/or eliminated, and the entendue and/or shape is matched to an etendue and/or shape of light modulator 501. Light modulator 501 generally comprises any suitable light modulator including but not limited to a DMD (digital multi-mirror device), an LCOS (liquid crystal on silicon) device, or the like. Light modulator 501 modulates the light into an image which is then projected on screen 505 using lens 503. It is appreciated that projector 500 further comprises any suitable components for conveying the light to light modulator 501 and to lens 501, powering and driving light modulator 501, or the like.

Hence, apparatus 100 provides a convenient and cost effective method of combining light from a plurality of coherent light sources for use in a projector, as well as reducing the coherency of the light to prevent speckle, and shaping the light for compatibility with a light modulator to prevent loss of light within the projector and increase the light efficiency.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. An apparatus for combining coherent light from a plurality of coherent light sources, the apparatus comprising:
 a plurality of light guides, each of said plurality of light guides comprising:
  an entrance face and an internal light guide exit surface;
  a first mirror at said entrance face, said first mirror comprising an aperture for admitting light therein from a respective one of said plurality of coherent light sources; and
  a second mirror covering said internal light guide exit surface, said second mirror being partially-reflective and enabled to transmit a first portion of said light and reflect a second portion of said light back towards said first mirror; and
 a second stage light guide for combining emitted light exiting said plurality of light guides, said second stage light guide comprising:
  a second stage entrance face and a second stage exit face, said second stage entrance face for receiving said emitted light from each said internal light guide exit surface of said plurality of light guides, said second mirror of each of said plurality of light guides between a respective internal light guide exit surface of each of said plurality of light guides and said second stage entrance face; and
  a third mirror, at said second stage exit face, for reflecting said light back towards said second mirror, said third mirror comprising an exit aperture for said light to exit said second stage light guide.

2. The apparatus of claim 1, wherein a shape of said exit aperture is matched to a shape of a light modulator of a projector.

3. The apparatus of claim 1, wherein an etendue of said exit aperture is matched to an etendue of a light modulator of a projector.

4. The apparatus of claim 1, wherein each of said plurality of light guides are generally aligned with one another along a common longitudinal axis.

5. The apparatus of claim 1, wherein said plurality of light guides are arranged in a regular array.

6. The apparatus of claim 1, wherein an area of said second stage entrance face is generally matched to a collective area of said internal light guide exit surfaces of said plurality of light guides.

7. The apparatus of claim 1, wherein said second stage entrance face is optically coupled to each said internal light guide exit surface of said plurality of light guides.

8. The apparatus of claim 1 wherein a respective length of each of said plurality of light guides is at least half as long as a coherence length of a respective one of said plurality of coherent light sources.

9. The apparatus of claim 1, wherein a length of said second stage light guide is less than a length of said plurality of light guides.

10. The apparatus of claim 1, wherein each of said plurality of light guides and said second stage light guide comprises at least one of a solid light pipe and a hollow light tunnel.

11. The apparatus of claim 1, wherein at least a portion of said plurality of light guides and said second stage light guide comprises reflective interior walls.

* * * * *